(12) United States Patent
Gordon et al.

(10) Patent No.: US 6,937,863 B1
(45) Date of Patent: Aug. 30, 2005

(54) SYSTEM AND METHOD FOR DYNAMICALLY ADJUSTING CELL SECTORIZATION

(75) Inventors: Scot D. Gordon, Bothell, WA (US); Ji-Hae Yea, Kirkland, WA (US); Martin J. Feuerstein, Redmond, WA (US); Jun Liu, Bellevue, WA (US)

(73) Assignee: Kathrein-Werke KG, Rosenheim (DE)

( * ) Notice: Subject to any disclaimer, the term of this patent is extended or adjusted under 35 U.S.C. 154(b) by 700 days.

(21) Appl. No.: 09/930,662

(22) Filed: Aug. 15, 2001

(51) Int. Cl.⁷ .............................................. H04Q 7/20
(52) U.S. Cl. ...................................... 455/446; 455/453
(58) Field of Search ................................ 455/446, 443, 455/453, 449, 450, 452.1, 452.2, 466; 342/368, 342/374, 372

(56) References Cited

U.S. PATENT DOCUMENTS

| | | | | |
|---|---|---|---|---|
| 5,542,098 A | * | 7/1996 | Bonta | 455/434 |
| 5,889,494 A | * | 3/1999 | Reudink et al. | 342/373 |
| 6,141,565 A | * | 10/2000 | Feuerstein et al. | 455/560 |
| 6,246,674 B1 | * | 6/2001 | Feuerstein et al. | 370/334 |
| 6,246,886 B1 | * | 6/2001 | Oliva | 455/426.1 |
| 6,400,335 B1 | * | 6/2002 | Weaver et al. | 343/853 |
| 6,549,781 B1 | * | 4/2003 | O'Byrne et al. | 455/446 |
| 6,580,899 B1 | * | 6/2003 | Dalgleish et al. | 455/69 |
| 6,671,512 B2 | * | 12/2003 | Laakso | 455/453 |
| 6,829,491 B1 | * | 12/2004 | Yea et al. | 455/560 |
| 2002/0022486 A1 | * | 2/2002 | Chen | 455/452 |
| 2003/0017831 A1 | * | 1/2003 | Lee et al. | 455/453 |
| 2005/0032520 A1 | * | 2/2005 | Muller | 455/448 |
| 2005/0070287 A1 | * | 3/2005 | Cave et al. | 455/436 |

OTHER PUBLICATIONS

U.S. Appl. No. 09/384,306, Feuerstein et al.
U.S. Appl. No. 09/393,124, Feuerstein.
U.S. Appl. No. 09/930,523, Gordon et al.

* cited by examiner

*Primary Examiner*—CongVan Tran
(74) *Attorney, Agent, or Firm*—Fulbright & Jaworski LLP

(57) ABSTRACT

The invention discloses a system and method which quantifies the traffic or load on a particular sector of a mobile communication cell site. The traffic quantification or load metric is preferably used to compare the load of each of the cell site's sectors. When the difference between load among the sectors reaches a certain level, the preferred embodiment of the present invention causes the sectorization of the site to change in order to alleviate or equalize the traffic load of the sectors. The system of the present invention continues to monitor the cell site for traffic conditions and for changes in the load responsive to the sectorization changes made in order to dynamically respond to the changing traffic conditions on the cell site.

46 Claims, 3 Drawing Sheets

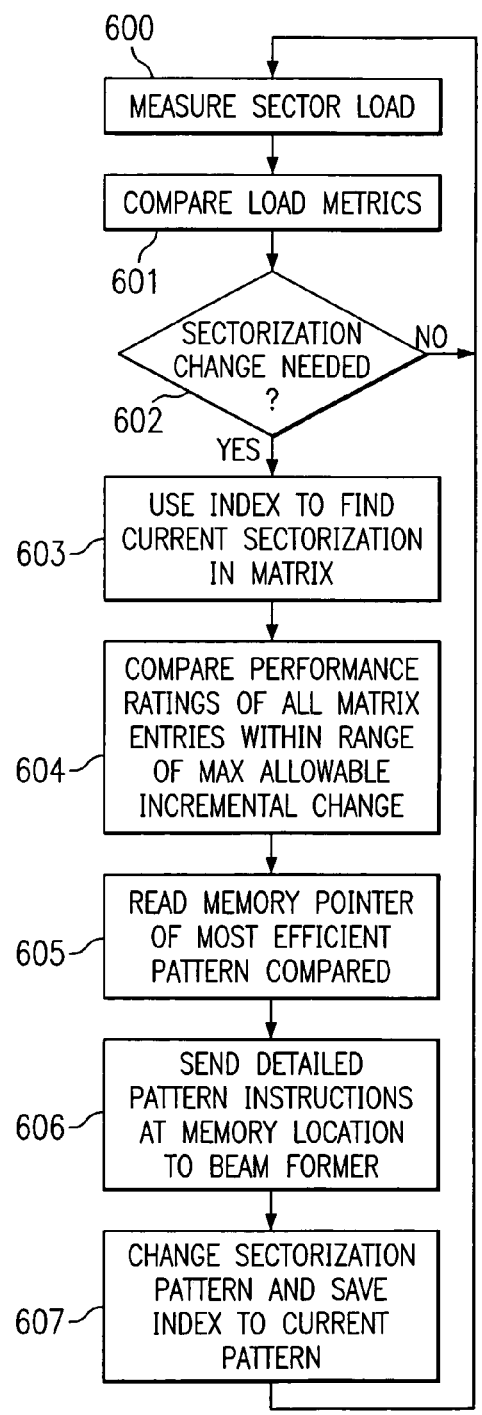
| | 51 | 52 | 53 | 54 | 55 |
|---|---|---|---|---|---|
| | $\alpha\|\beta$ | $\beta\|\gamma$ | $\gamma\|\alpha$ | MEMORY LOCATION | PERFORMANCE RATING |
| 0 | 0° | 120° | 240° | 0A27F | 50 |
| 1 | 5° | 120° | 240° | 0A280 | 52 |
| 2 | 10° | 120° | 240° | 0A2FC | 55 |
| ⋮ | ⋮ | ⋮ | ⋮ | ⋮ | ⋮ |
| N−1 | 0° | 120° | 230° | 0F248 | 70 |
| N | 0° | 120° | 235° | 0F266 | 25 |
*FIG. 5*   50
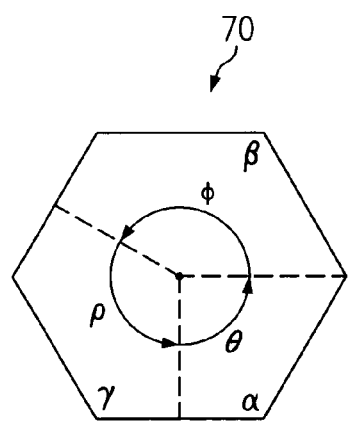
*FIG. 7*
*FIG. 6*

SYSTEM AND METHOD FOR DYNAMICALLY ADJUSTING CELL SECTORIZATION

RELATED APPLICATIONS

Reference is hereby made to the following concurrently-filed, co-pending, commonly assigned, U.S. patent application Ser. No. 09/930,523 entitled, "DYNAMIC AND SELF-OPTIMIZING SMART NETWORK;" and to commonly assigned, co-pending U.S. patent applications: Ser. No. 08/924,285, entitled, "ANTENNA DEPLOYMENT SECTOR CELL SHAPING SYSTEM AND METHOD," filed on Sep. 5, 1997 and now issued as U.S. Pat. No. 6,246,674; Ser. No. 09/384,306, entitled, "ANTENNA DEPLOYMENT SECTOR CELL SHAPING SYSTEM AND METHOD," filed on Aug. 26, 1999; and Ser. No. 09/393,124, entitled, "INPUT SPECIFIC INDEPENDENT SECTOR MAPPING," filed on Sep. 10, 1999, the disclosures of which are incorporated herein by reference.

TECHNICAL FIELD

This invention relates to wireless communication systems and, in particular, to a signal radiation network of a wireless communication system which can be dynamically adjusted in response to changing network load and/or environmental conditions.

BACKGROUND

In typical cellular systems today, and particularly, in code division multiple access (CDMA) systems, the communication network is divided into a series of cells over a geographic area. Each cell is typically centered around at least one base transceiver station (BTS). Each cell also is usually divided into a fixed number of sectors having directional transmission/receiving capabilities. One typical sectorization scheme divides the cell into three equal sectors each covering 120° of the cell site. Other sectorization schemes may generally have sectors covering 60°, 30° or any other chosen coverage range. However, once the sectorization scheme has been chosen, it generally remains fixed for the life of the cell and/or BTS.

Unlike current cell sectorization schemes, cell site traffic does not usually remain constant or fixed. Sector traffic may even widely vary depending on the time of day. For example, one sector may be heavily loaded during rush hour traffic times, but at all other times only very lightly loaded. Heavy site traffic may have the undesirable consequence of causing some calls or communication links to be dropped, thus, decreasing the reliability and efficiency of the sector and the cell site in general.

Similarly, environmental conditions are hardly predictable and may cause drastic and unpredictable variations in sector performance.

It would therefore be advantageous to have a system and method for estimating the load on each sector of a cellular network cell and then, based on the comparative loads, dynamically change the dimensions of any one or more sectors in order to equalize the loading of the entire cell.

SUMMARY OF THE INVENTION

The present invention is directed to a system and method for dynamically changing the sectorization of a multiple sector wireless communication cell. A preferred embodiment of the present invention comprises a signal monitor disposed in a signal path of a BTS for monitoring signal attributes of a signal transmitted to each of the multiple sectors. These signal attributes are then preferably processed by a signal processor into a load metric or quantified traffic measurement for each of the monitored sectors. Once the loading metric of each sector is determined, the metrics may be compared to determine the relative loads of the cell sectors. A sector forming unit may then be operated according to a preferred embodiment of the present invention to selectively adjust the sector dimensions of one or more of the multiple sectors responsive to the comparison.

The preferred embodiment system and method obtains signal attributes by placing a forward link monitoring assembly (FLMA) into the transmission path of the cell site communication system. An FLMA may preferably substantially comprise the inner receiver components of a typical mobile unit or phone. The FLMA preferably comprises a signal decoding mechanism which is capable of passively monitoring and decoding the signals, such as pilot signals, typically transmitted to accessing mobile units. It also preferably measures the ratio of pilot signal power to the interference power. The decoded and measured information will then preferably be reported to a central controlling mechanism that determines, based on the resulting information, how best to configure the dimensions of the cell site.

The system and method of the present invention may beneficially utilize technology disclosed in commonly assigned, co-pending patent applications, both entitled, "ANTENNA DEPLOYMENT SECTOR CELL SHAPING SYSTEM AND METHOD," the disclosures of which are incorporated herein by reference, which allows for adjusting the dimensions of any particular sector, thus changing the sectorization of the cell. Therefore, a preferred embodiment of the present invention may beneficially determine relative cell sector traffic loads and then, using the adjustable sector technology of the above-mentioned patent applications, vary the sizes of the cell sectors to equalize the traffic loads on the cell site.

The system and method of a preferred embodiment of the present invention may use a single FLMA along with a radio frequency (RF) switch that preferably allows the FLMA to sequentially monitor any cell site sector for a given period of time. The single FLMA would therefore measure the signal attributes for each sector serially. Conversely, an FLMA may be placed in the transmission path for each sector of the cell site. The multiple FLMAs would then be able to simultaneously calculate the load metric or indicator for each sector.

In CDMA systems, the FLMA preferably measures a parameter called the pilot-to-interference ratio. This parameter is generally a measurement of the ratio of the pilot signal power to the interference signal power. A CDMA pilot signal is usually a known signal with a known power that basically defines the boundaries of a sector. It is also typically used by the mobile device to decode the transmitted channel. However, when it is received by a mobile device, it has experienced environmental scattering effects such as fading and also is affected by interference from other mobile device transmissions within the cell. Therefore, the signal decoding mechanism found in mobile devices and the FLMA may preferably measure a quantified estimate of the cell load by decoding the pilot signal and measuring the pilot-to-interference ratio of that pilot as transmitted by the BTS. However, the results of the FLMA measurements are preferably more accurate, and thus a better representation of the actual load on the sector, because it does not have to measure any of the atmospheric interference.

For example, if there are five mobile devices in the cell network that are each accessing the network at the same sector, there will be five traffic channels transmitted through that sector's signal transmission path. The pilot-to-interference ratio, which generally comprises the ratio of the pilot over the sum of the total energy devoted to the traffic channels and overhead channels, will therefore, preferably indicate an estimate of the traffic load in that sector. According to a preferred embodiment of the present invention, the FLMA would preferably decode the pilot signal, measure the pilot-to-interference ratio, and send the results to the controller for processing and determining the appropriate course of action regarding the sector dimensions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 5 is a block diagram illustrating the N×5 pattern switching matrix according to a preferred embodiment of the present invention;

FIG. 6 is a flow chart illustrating the steps utilized in implementing a preferred embodiment of the present invention; and FIG. 7 is a diagram illustrating a cell sector configuration obtained using a cellular system implemented using a preferred embodiment of the present invention.

DETAILED DESCRIPTION

Figure 1:
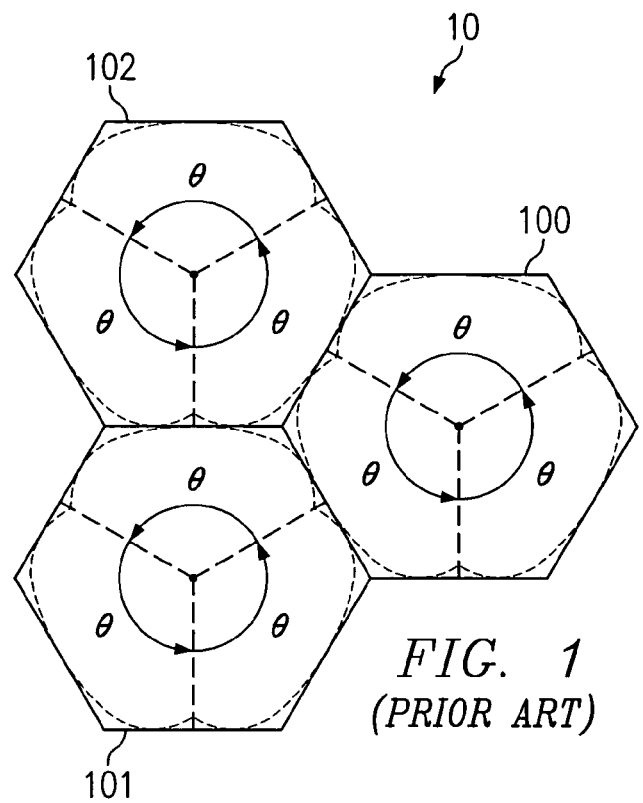
FIG. 1 is a block diagram illustrating a prior art cell sector configuration.

FIG. 1 illustrates three cells of a typical fixed sectorization scheme as found in prior art cellular communication systems. System 10 is divided into three individual cells 100–102. Each cell is further divided into three sectors. As is typical in the prior art, θ represents the angle defining the sectorization of the entire cell and network. Cells 100–102 each are sectorized into equal sectors each covering 120° (i.e., θ=120°). The sectors of the prior art systems generally remain fixed regardless of changing environmental or sector load conditions.

Figure 2:
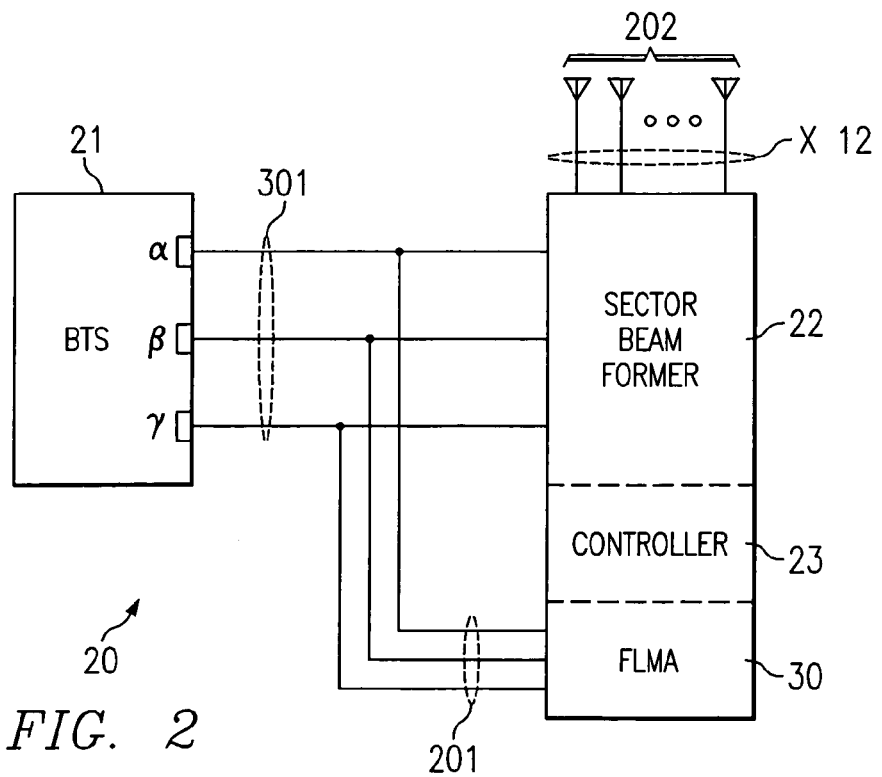
FIG. 2 is a block diagram illustrating preferred embodiment of the present invention.

FIG. 2 illustrates a preferred embodiment of the present invention.

Communication system 20, such as may comprise cellular base transceiver station (BTS) radios 21 having three sector outputs, alpha ($\alpha$), beta ($\beta$), and gamma ($\gamma$), which are input to sector beam former 22. Sector beam former 22 of the illustrated embodiment includes controller 23 and forward link monitoring assembly (FLMA) unit 30. Controller 23 may typically comprise a general purpose computer with software for controlling the operation of the preferred embodiment of the present invention. Additionally or alternatively, controller 23 may comprise an application specific processor with embedded firmware for controlling the operation of the preferred system. Any computing device capable of making calculation and controlling external outputs according to the present invention may be used for controller 23.

Sector beam former 22 allows for the formation of sectors with selectably controllable beam widths, beam lengths, and/or azimuths. For example, the preferred embodiment uses antenna array 202, comprised of twelve antenna columns, such that the $\alpha$, $\beta$, and $\gamma$ signals may be controlledly coupled to one or more antenna columns having a desired phase and/or amplitude relationship, in order to form an antenna beam of a desired shape and/or size oriented in a desired azimuthal direction. The phase and/or amplitude relationships define the effective radiation pattern of antenna array 202. To accomplish this variation of sector size, sector beam former 22 may include technology as described in the aforementioned co-pending patent applications both entitled, "ANTENNA DEPLOYMENT SECTOR CELL SHAPING SYSTEM AND METHOD."

Figure 3:
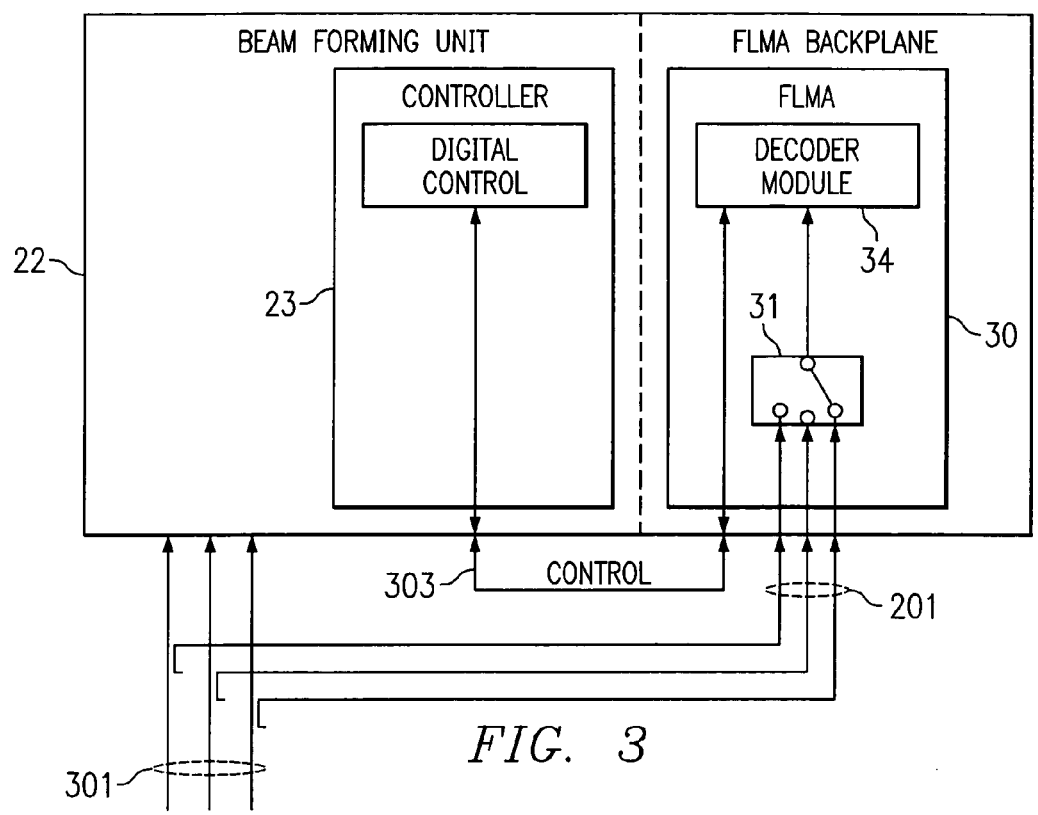
FIG. 3 is a detailed block diagram illustrating the controller and FLMA module of a single beam forming unit communication system configured according to a preferred embodiment of the present invention.

FIG. 3 provides a more detailed illustration of a preferred embodiment of a subsystem comprising controller 23 and FLMA 30, which are included in sector beam former 22. FLMA 30 of the illustrated embodiment receives the three sector inputs, $\alpha$, $\beta$, and $\gamma$, via links 201, which are coupled off of links 301 between radios 21 and sector beam former 22. FLMA 30 preferably includes radio frequency (RF) switch 31, which switches between each of the three sector inputs, $\alpha$, $\beta$, and $\gamma$, for purposes of monitoring individual sectors. Controller 23 may provide control signals with respect to FLMA 30, such as to control selection of an individual sector for monitoring.

It should be appreciated that in the illustrated embodiment FLMA 30 is disposed in a backplane configuration and accordingly is provided with external links 201. However, alternative embodiments of the invention may provide input of sector signals to FLMA 30 using links internal to sector beam former 22.

According to a preferred embodiment, signal decoder 34 of FLMA 30 decodes the signal selected by switch 31 for processing according to the present invention. Once decoded, FLMA 30 measures the signal attributes associated with the signal. In CDMA systems, FLMA 30 preferably measures the signal power of the pilot channel, the paging channel, and the synch channel and also measures the pilot-to-interference ratio of the decoded signal.

Preferably signal decoder 34 is provided using readily available circuitry, such as decoder circuits developed for use in mobile units operating with system 20. For example, in CDMA systems, signal decoder 34 may preferably substantially comprise a CDMA module as typically included in CDMA mobile communication units or mobile phones.

FLMA 30 preferably transmits the decoded and measured signal attributes to controller 23 using control line 303. Control line 303 is preferably a two-way communication bus between controller 23 and FLMA 30. Controller 23 preferably uses control line 303 to poll FLMA 30, signal decoder 34, or otherwise provide control signals to FLMA 30 and/or receive information from FLMA 30, while FLMA 30 uses control line 303 to transmit the measured data.

Figure 4:
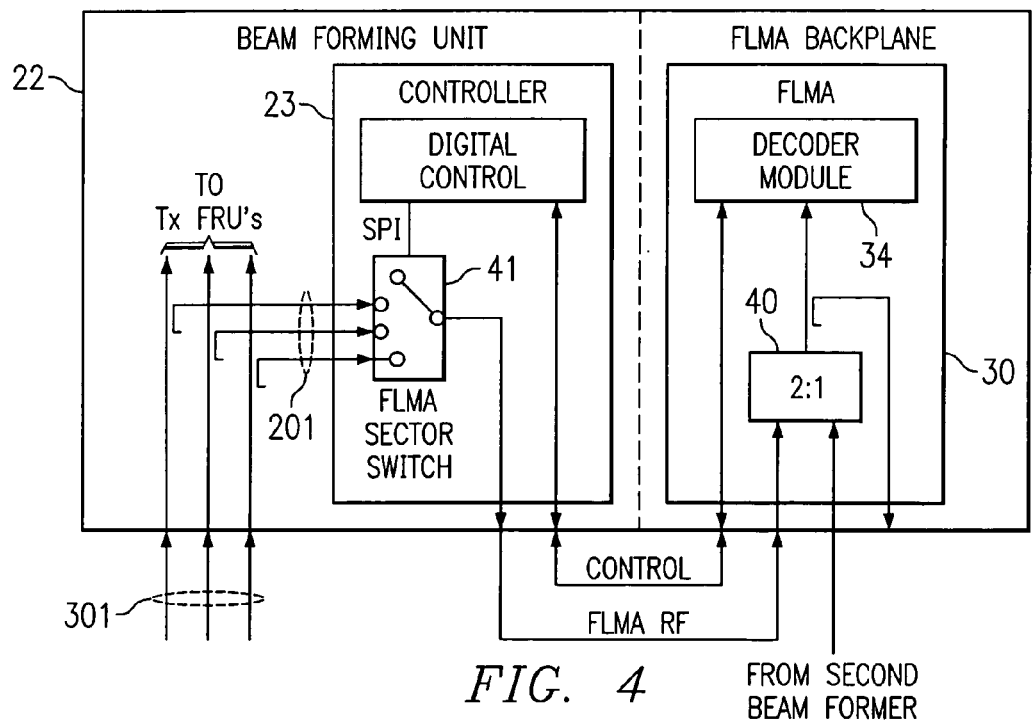
FIG. 4 is a detailed block diagram illustrating the controller and FLMA module of a dual beam forming unit communication system configured according to a preferred embodiment of the present invention.

FIG. 4 shows an alternative embodiment of the present invention incorporating 2-to-1 combiner 40. A communication system or cell site may be configured to include a number of beams exceeding that which may be formed using a beam forming unit configured as shown in FIG. 3. For example, a cell may be provided six sectors in its coverage area rather than the three sectors accommodated by the beam forming unit of FIG. 3. This type of configuration might be used, for example, to partition carriers in the same cell site so that the different carriers can each have different sectorization schemes. Such a multiple carrier system may be implemented according to the commonly-assigned, co-pending patent application entitled, "INPUT SPECIFIC INDEPENDENT SECTOR MAPPING."

In order to provide these multiple sectorization schemes, multiple sector beam formers or beam forming units are implemented according to the illustrated embodiment. 2-to-1 combiner 40 accommodates a second beam forming unit (not shown). According to the illustrated embodiment, RF switch 41 is provided associated with beam former 22 to allow selection of any sector signal associated therewith or selection of no signal. Likewise, an RF switch (not shown) is preferably provided associated with the second beam forming unit (not shown) to allow selection of any sector signal associated therewith or selection of no signal. Accordingly, 2-to-1 combiner 40 will provide a selected sector signal to decoder module 34 for operation according to the present invention as described above with respect to FIG. 3.

It should be noted that although the beam forming units described above included only three sectors, beam forming units may be configured to provide any desired or practicable number of sectors. The present invention is, therefore, not limited solely to a three sector system. It should further be noted that other combiners with greater combination capacity may be incorporated to accommodate more than two beam forming units.

In an alternative embodiment of the present invention, a multiple beam forming unit system may be implemented by increasing the capacity of selection circuitry, such as RF switch 31 or RF switch 41. For example, instead of merely switching between the sector inputs of the first beam former, a modified RF switch (not shown) may switch between the sector inputs of the first beam former and then switch to the sector inputs of the later beam formers.

Once the controller receives the measurements of the signal attributes, it preferably calculates a value representative of the load or level of traffic on a particular sector using an FLMA dynamic algorithm. The pilot-to-interference ratio, $E_c/I_o$, measured by the FLMA, may preferably be defined according to the following equation:

$$Ec/Io = \frac{P_{pilot}}{P_{pilot} + P_{paging} + P_{sync} + \sum_{i=1}^{N} P_{traffic}(i) + W} \quad (1)$$

where $P_{pilot}$ is the pilot channel power, $P_{paging}$ is the paging channel power, $P_{sync}$ is the synch channel power, $P_{traffic}(i)$ is the traffic channel power for the ith of N traffic channels, and W is the thermal noise.

Because the denominator of Equation 1 is predominated by traffic and overhead channels, W may be neglected to arrive at the following modified equation:

$$Ec/Io = \frac{P_{pilot}}{P_{pilot} + P_{paging} + P_{sync} + \sum_{i=1}^{N} P_{traffic}(i)} \quad (2)$$

$P_{pilot}$, $P_{paging}$, and $P_{sync}$ are fixed channels with known power levels. Further, Ec/Io is a measured quantity, so the unknown, $$P_{traffic} = \sum_{i=1}^{N} P_{traffic}(i),$$

is the traffic load on the site.

Equations 1 and 2 basically define $E_c/I_o$ as the energy in a single "chip." In CDMA systems, a chip is the smallest waveform of the pilot. A chip comprises the rapid changes in the spread spectrum signal, transmitted as the pilot signal. This signal appears much like white noise. In typical CDMA systems, the rate of spread spectrum signaling, known as the chip rate, is approximately 1.24 MHz.

The $E_c/I_o$ measurement is the energy that exists in that chip over the entire spectral density of the signal. Therefore, the measurement taken is not just pilot-to-interference ratio, but actually pilot-to-pilot-plus-overhead-plus-traffic-channels, which is essentially the energy in a chip over the total received energy of the signal for that CDMA carrier. Because the pilot has a fixed transmission power, as do the other overhead channels, paging and synch, the traffic on any given channel, which is the variable quantity, causes the $E_c/I_o$ to vary on that CDMA channel.

Solving for the traffic variable in Equation 2 yields a quantification of the energy or power that exists in the traffic channels over the monitored sector, as shown in the following equation:

$$P_{traffic} = \frac{P_{pilot}}{Ec/Io} - (P_{pilot} + P_{paging} + P_{sync}) \quad (3)$$

This measurement reflects the amount of traffic present on each sector of a given cell.

While Equation 3 solves for a power value representative of the traffic on a cell sector, it does not typically give a full representation of the traffic relative to the power transmitted from the sector. In CDMA systems, there is generally a design criteria that limits the power transmitted from any single sector. This maximum power provides a reference point for relating the calculated traffic channel power. In the following equation:

$$L = \frac{P_{traffic}}{P_{Max}} = \frac{P_{pilot}}{(Ec/Io)P_{Max}} - \frac{(P_{pilot} + P_{paging} + P_{sync})}{P_{Max}} \quad (4)$$

the traffic channel power, $P_{traffic}$, is normalized to the maximum sector transmission power, $P_{Max}$, to arrive at a percentage of maximum power attributable to sector traffic, L, referred to as the forward link load. L, therefore, preferably provides an intuitive measure as to the load or traffic of any particular cell sector.

Equations 1 through 4 are preferably applied to the measurements taken for each sector to arrive at the load metrics for each sector of the cell site. In order to provide an accurate measurement of load or traffic, sector measurement samples are preferably taken over time and filtered, such as by using a single pole filter, to calculate an average load metric. In a preferred embodiment of the present invention, there is only a single FLMA to take and provide the signal samples. Therefore, each sector is preferably monitored for a predetermined period of time after which its measurement are filtered according to the following single pole filter equation:

$$\hat{L}i[n]=(1-\alpha)\hat{L}i[n]+\alpha Li[n-1] \quad (5)$$

to average the samples, where $\hat{L}i[n]$ is the nth average value of sector traffic percentage and α is a filter coefficient.

After monitoring the sector for the predetermined period of time, an RF switch preferably switches the monitored signal to the next subsequent sector. An averaged, time filtered, load metric is, therefore, preferably calculated for each sector. These load metrics are preferably used to determine the sectorization of the cell site.

The load metrics of each of the sectors are preferably compared to determine the minimum and maximum loaded sector. If the minimum and maximum differ by some predefined threshold, the sectors will preferably be adjusted to equalize the traffic across the cell site. However, if they do not differ substantially, for example, if the maximum loaded sector reflects a 70% load and the minimum loaded sector reflects a 68% load, the cell site reflects well-balanced traffic conditions, which will typically not need to be adjusted at that time. For larger differences, for example, in a cell site where the maximum loaded sector reflects a 70% load and the minimum loaded sector reflects a 30% load, adjusting the sectorization may preferably improve the performance or the capacity of the cell site.

It should be noted that in an alternative embodiment of the present invention may also incorporate a cell site minimum load percentage for performing re-sectorization. For example, consider sectors in a particular cell site that start becoming congested at a 65% load. If a first sector is determined to be 30% loaded and a second sector is determined to be empty, i.e., 0% loaded, it may not be desirable to re-sectorize for such a small load, even though the comparative loading is quite substantial. Therefore, in such a cell site of an alternative embodiment, re-sectorization would preferably not occur until at least one of the sectors reaches a predetermined loading percentage. In the example presented above, the system administrator may determine that it would be beneficial to begin re-sectorization once a sector reaches 50% (which is below 65%, the level determined for initial congestion).

In a cell site administered according to the present invention, a sector configuration may be defined by sector boundaries. For example, there may be a boundary between α sector and β sector at 0°, between β sector and γ sector at 120°, and between γ sector and α sector at 240°, thus creating three equal sectors each covering 120°. These boundaries define the typical, prior art static sectorization scheme. In the present invention, when it is determined that the sectorization scheme should be changed to equalize the traffic or loading conditions on one or more of the cell sectors, the system preferably begins by making gradual changes to the sector boundaries. In other words, the boundary between α sector and β sector at 0°, for example, may be gradually increased to 5°. The net effect of this change increases α sector coverage to 125° and decreases β sector coverage to 115°.

It should be noted that in an alternative embodiment of the present invention, it may be desirable to define overlapping sectors. In such a system, the sector configuration may preferably be defined by the beam widths and/or azimuth settings instead of sector boundaries.

FIG. 5 shows a preferred embodiment of the present invention using a non-overlapped three-sector configuration implements the variations in sectorization through a pattern switching matrix. Pattern switching matrix 50, is an N×5 matrix, where N is the number of available patterns in matrix 50, and the 5 represents the memory locations holding boundaries angles 51–53 between the sectors, pattern location pointer 54, and pattern performance rating 55. Boundary angles 51–53 generally define the sector pattern. Pattern location pointer 54 points to the physical memory location in the embedded controllers of the communication system, which contain all of the necessary detailed instructions regarding how to obtain the particular sector pattern, i.e., the set of complex weights, phase, and amplitude settings that will produce the desired boundary definitions of the selected sector pattern from the transducing mechanism or antenna array. Pattern performance rating 55 stores a rating which is based on the capacity and performance of the cell for the particular sectorization pattern. Rating 55 may be manually added by a system administrator who may calculate the performance and capacity of the cell site for the associated patter. Alternatively, the controllers of the communication system may measure the capacity of each sector for any given sector pattern scheme. The controllers would then preferably calculate an efficiency rating or other performance indicator based on the capacity and performance it measures. This matrix information may then preferably be used to determine the most appropriate pattern change in response to the changing traffic or environmental conditions.

The pattern switching matrix preferably defines all the available patterns and sector configurations available to the communication system. FIG. 6 shows a flow chart of the steps performed in typical operation of a system configured according to a preferred embodiment of the present invention. The process begins at step 600 by preferably measuring the load metrics of each sector. These load metrics are then preferably compared against each other and against a minimum load required to elicit sectorization changes in step 601. The determination is made at step 602 whether the comparison requires the system to change the sectorization. If none of the predetermined standards have been exceed, the system preferably returns to step 600 to measure the sector loading again. If, however, the system determines that a change needs to be made, the preferred embodiment of the present invention uses the index to find the current sectorization scheme in the pattern switching matrix at step 603. At step 604, the controller preferably compares the performance ratings of each of the matrix entries within a distance from the current scheme equal to the maximum allowable incremental change of sector parameters. Once the most efficient pattern has been determined, the memory point information is preferably read at step 605, after which the detailed pattern instructions are preferably communicated to the beam former in step 606. Using the detailed pattern information, the beam forming unit advantageously changes the sectorization pattern and causes the index for the new pattern to be saved at step 607.

After the change is made, the system preferably begins remeasuring the signal attributes of the sector signals, from step 600, to observe the effect of the change that was made. This process may reveal that the traffic imbalance has preferably been alleviated or may preferably indicate that additional changes are necessary.

The system and method of the preferred embodiment of the present invention produces observable changes in the measured and calculated load metrics because the pattern change preferably causes changes in the radiation pattern of the cell antenna. By varying the coverage of the sectors, traffic is preferably shifted from one sector to another. This effectively causes the signals to be changed at the BTS or may even preferably cause traffic to shift from one BTS to another. Because the operation of the present invention will cause the changes at the BTS, the small incremental changes are used to minimize the impact on the network.

FIG. 5 illustrates a cell site configured with a dynamically adjusting sectorization system according to a preferred embodiment of the present invention. Cell 50 is divided into three sectors, $\alpha$, $\beta$, and $\gamma$. Each one of the sectors has boundaries with the other sectors. Cell 50 shows $\gamma|\alpha$ boundary at 0°, $\alpha|\beta$ boundary at 90°, and $\beta|\gamma$ boundary at 240°. These boundaries create a sector coverage of $\theta$=90°, $\beta$ sector coverage of $\phi$=150°, and $\gamma$ sector coverage of $\rho$=120°.

Under the operation of the present invention, the traffic indicators for $\alpha$ sector and $\beta$ sector would typically have indicated to the system to increase the sector coverage of $\beta$ to shift some of the traffic from $\alpha$ into $\beta$. The preferred embodiment of the present invention would preferably have begun the adjustment process by making incremental changes to the $\alpha|\beta$ boundary. For example, in systems where the pattern switching matrix defined steps of 5° between different sectorization patterns, the $\alpha|\beta$ boundary would preferably have incremented through the steps of 115°, as the first step. After each increment, the sectorization system of the present invention would have preferably re-measured and reevaluated the traffic indicator or load metrics of cell 50. At 90°, as shown in the FIG. 5 example, the preferred embodiment of the present invention would preferably re-evaluate the traffic conditions and either continue incrementing the $\alpha|\beta$ boundary, hold the boundary as is, or even begin incrementing the boundary in the opposite directions for traffic conditions changing to the detriment of $\beta$ sector.

It should be noted that in one embodiment of the present invention, the system may only periodically monitor the traffic conditions on the cell. Alternative embodiments may also be configured to perform continual monitoring of the traffic conditions using any time frame such as every minute, ten minutes, hours, days, or other desirable time frame.

It should also be noted that an alternative embodiment of the present invention may include multiple FLMA modules placed in each of the signal paths to each sector. In this alternative embodiment, the signal attribute measurements may preferably be obtained simultaneously for each sector. Furthermore, the load metrics or traffic indicators may also preferably be calculated simultaneously according to the described alternative embodiment.

It should further be noted that although a preferred embodiment is shown and described herein having only three sectors, the present invention is not so limited. Alternative embodiments may employ many different configurations of sectors including six, twelve, etc.

It should further be noted that while the preferred embodiment of the present invention has been described as making only incremental 5° adjustments, alternative embodiments of the present invention may evaluate the imbalance and vary the adjustment step size according to the size of the imbalance.

Although preferred embodiments of the present invention have been described with reference to providing sectorization adjustment with reference to loading as measured in a forward link, alternative embodiments may operate to utilize reverse link metrics in operation according to the present invention. For example, a receive metric, such as a receive signal strength indicator (RSSI) may be used in determining sector loading and, therefore, sector sizing. According to a preferred embodiment, a BTS utilizes multiple narrow beams, such as 12 30° non-overlapping beams providing 360° coverage of a cell, and a scan receiver monitors each beam receive signal. Sector loading may be determined for use according to the present invention by combining RSSI levels on those beams which are used in synthesizing a particular sector (e.g., 4 particular 30° beams used to synthesize a 120° sector beam).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for dynamically adjusting sectorization of a multiple sectored cell in a cell-based communication system comprising:

a signal monitor disposed in a signal path of said communication system for monitoring signal attributes of a signal transmitted to each of said multiple sectors;

a signal processor for processing said monitored signal attributes into a load metric for each of said multiple sectors; and a sector forming unit for selectively adjusting sector dimensions of one or more of said multiple sectors responsive to a comparison of said load metric for each of said multiple sectors.

2. The system of claim 1 wherein said signal monitor comprises a code division multiple access (CDMA) decoder.

3. The system of claim 1 wherein said monitored signals comprise a pilot signal and wherein said signal attributes comprise:
 a pilot channel power; and
 a pilot-to-interference ratio.

4. The system of claim 3 wherein said signal attributes further comprise:
 a paging channel power;
 a synch channel power; and
 a traffic channel power.

5. The system of claim 4 wherein said signal attributes further comprise thermal noise.

6. The system of claim 4 wherein said load metric comprises a relationship between said pilot channel power, said paging channel power, said synch channel power, and said pilot-to-interference ratio.

7. The system of claim 5 wherein said relationship is determined according to the formula:

$$P_{traffic} = \frac{P_{pilot}}{Ec/Io} - (P_{pilot} + P_{paging} + P_{sync})$$

wherein Ec/Io represents the pilot-to-interference ratio.

8. The system of claim 6 wherein said load metric is normalized to a preset maximum power rating for each of said multiple sectors.

9. The system of claim 8 wherein said normalization is calculated according to the formula:

$$L = \frac{P_{traffic}}{P_{Max}}$$

wherein L represents said normalized load metric.

10. The system of claim 1 wherein said sector forming unit comprises:
 a beam width controller; and an azimuth controller.

11. The system of claim 10 further comprising a signal power controller.

12. The system of claim 1 wherein said signal monitor is disposed in each of said transmission signal paths of said system corresponding to each of said multiple sectors.

13. The system of claim 12 wherein each sector's load metric is determined simultaneously.

14. The system of claim 1 further comprising:
 a switch in communication with said signal monitor and with each signal path of said multiple sectors, said switch for alternately switching signals disposed on each of said signal paths into said signal monitor.

15. The system of claim 14 wherein said signal monitor serially determines said load metric for each of said multiple sectors.

16. The system of claim 1 wherein said load metric comprises an average of measurements taken during a predetermined time period.

17. The system of claim 16 wherein said average is calculated according to the formula:

Li[n]=(1−α)Li[n]+αLi[n−1]

wherein L̂i[n] represents a current average value, L̂i[n−1] represents a previous average value, and α represents a filter parameter.

18. A method for dynamically adjusting sectorization of a multiple sectored cell in a cellular communication system comprising the steps of:
 measuring signal properties along a sector transmission path for each of said multiple sectors of said multiple sector communication system;
 calculating a load indicator for each of said multiple sectors using said measured signal properties;
 comparing said calculated load indicators for each of said multiple sectors to determine comparative load between said multiple sectors; and
 gradually adjusting the dimensions of said multiple sectors responsive to said determined comparative load.

19. The method of claim 18 wherein said measuring step comprises the steps of:
 measuring a power of a pilot channel; and
 measuring a pilot-to-interference ratio.

20. The method of claim 19 wherein said measuring step further comprises the steps of:
 measuring a power of a paging channel; and
 measuring a power of a synch channel.

21. The method of claim 20 wherein said calculating step comprises the step of solving for a power of a traffic channel using a relationship between said measured pilot channel power, said measured paging channel power, said measured synch channel power; and said measured pilot-to-interference ratio.

22. The method of claim 21 wherein said relationship comprises the formula:

$$P_{traffic} = \frac{P_{pilot}}{Ec/Io} - (P_{pilot} + P_{paging} + P_{sync})$$

wherein Ec/Io represents the pilot-to-interference ratio.

23. The method of claim 21 wherein said calculating step further comprises normalizing said solved traffic channel power to a predetermined maximum power rating for each of said multiple sectors.

24. The method of claim 23 wherein said normalization is calculated according to the formula:

$$L = \frac{P_{traffic}}{P_{Max}}$$

wherein L represents said normalized traffic channel power.

25. The method of claim 18 wherein said gradually adjusting step comprises the step of gradually adjusting one or more of a beam width and an azimuth angle.

26. The method of claim 25 wherein said gradually adjusting step further comprises the step of adjusting a transmission signal power.

27. The method of claim 18 wherein said calculating said load indicator step comprises the step of:
 simultaneously calculating said load indicator for each of said multiple sectors.

28. The method of claim 18 wherein said measuring signal properties step further comprises the step of alternately switching between said signal transmission path of each of said multiple sectors; and
 wherein said calculating said load indicator step comprises the step of:
 serially calculating said load indicator for each of said multiple sectors.

29. The method of claim 18 wherein said calculated load indicator comprises an average of said signal properties measured during a predetermined time period.

30. The system of claim 29 wherein said average is calculated according to the formula:

$$L\hat{i}[n]=(1-\alpha)L\hat{i}[n]+\alpha L\hat{i}[n-1]$$

wherein L̂i[n] represents a current average value, L̂i[n−1] represents a previous average value, and α represents a filter parameter.

31. A method for dynamically redistributing sector traffic in a multiple sector, wireless communication cell comprising the steps of:
  determining an amount of traffic for each of said multiple sectors in said cell;
  comparing said determined amounts of traffic for each of said multiple sectors, said comparing comprising the steps of:
    determining a maximum loaded sector using said determined amounts of traffic;
    determining a minimum loaded sector using said determined amounts of traffic; and
    comparing a difference between said maximum and said minimum loaded sector with a predefined traffic differential limit; and
  redistributing said sector traffic responsive to results of said comparing step.

32. The method of claim 31 wherein said determining an amount of traffic step comprises the steps of:
  measuring signal attributes of a pilot signal transmitted from a transceiver of said wireless communication cell; and
  calculating a traffic load indicator using said measured signal attributes.

33. The method of claim 31 wherein said redistributing step comprises the steps of:
  receiving a signal indicating said difference between said maximum and said minimum loaded sector exceeds said predefined traffic differential limit;
  adjusting a coverage area of at least one sector in said multiple sectors.

34. The method of claim 33 wherein said adjusting said coverage area step comprises the step of:
  adjusting a beam width and an azimuth of an antenna transmission from said cell.

35. The method of claim 34 further comprising the step of:
  adjusting a power of said antenna transmission from said cell.

36. A system for dynamically adjusting sectorization of a multiple sectored cell in a cell-based communication system comprising:
  a signal monitor disposed in a signal path of said communication system for monitoring signal attributes of signals received in association with each of said multiple sectors;
  a signal processor for processing said monitored signal attributes into a load metric for each of said multiple sectors; and
  a sector forming unit for selectively adjusting sector dimensions of one or more of said multiple sectors responsive to a comparison of said load metric for each of said multiple sectors.

37. The system of claim 36 wherein said signal monitor comprises a scan receiver.

38. The system of claim 37 wherein said signal attributes comprise a receive signal strength indicator.

39. The system of claim 38 wherein said multiple sectors are formed using multiple narrow antenna beams, and wherein said monitored signal attributes of signals received in association with each said multiple sectors include a receive signal strength indicator for each narrow antenna beam associated with each particular sector of said multiple sectors.

40. The system of claim 36 wherein said sector forming unit comprises:
  a beam width controller; and
  an azimuth controller.

41. The system of claim 40 further comprising a signal power controller.

42. The system of claim 36 wherein said signal monitor is disposed in each receive signal paths of said system corresponding to each of said multiple sectors.

43. The system of claim 42 wherein each sector's load metric is determined simultaneously.

44. The system of claim 36 further comprising:
  a switch in communication with said signal monitor and with each signal path of said multiple sectors, said switch for alternately switching signals disposed on each of said signal paths into said signal monitor.

45. The system of claim 44 wherein said signal monitor serially determines said load metric for each of said multiple sectors.

46. The system of claim 36 wherein said load metric comprises an average of measurements taken during a predetermined time period.

* * * * *